United States Patent
Fujii

(10) Patent No.: US 9,506,567 B2
(45) Date of Patent: Nov. 29, 2016

(54) SHAFT SEAL

(71) Applicant: MITSUBISHI CABLE INDUSTRIES, LTD., Tokyo (JP)

(72) Inventor: Nobukazu Fujii, Arida (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/626,032

(22) Filed: Feb. 19, 2015

(65) Prior Publication Data

US 2015/0267817 A1 Sep. 24, 2015

(30) Foreign Application Priority Data

Mar. 24, 2014 (JP) .................................. 2014-59920

(51) Int. Cl.
*F16J 15/32* (2016.01)

(52) U.S. Cl.
CPC ........... *F16J 15/3268* (2013.01); *F16J 15/322* (2013.01); *F16J 15/3228* (2013.01)

(58) Field of Classification Search
CPC .... F16J 15/32; F16J 15/3204; F16J 15/3216; F16J 15/3228; F16J 15/3248; F16J 15/3252; F16J 15/3268; F16J 15/328; F16J 15/3232; F16J 15/3256; F16J 15/326
See application file for complete search history.

(56) References Cited

U.S. PATENT DOCUMENTS

| | | | | |
|---|---|---|---|---|
| 2,196,337 A * | 4/1940 | Loweke | ............... | F16J 15/3204 277/439 |
| 3,106,405 A * | 10/1963 | Pringle | ................. | B21B 31/078 277/423 |
| 3,291,495 A * | 12/1966 | Liebig | ................. | F16J 15/3224 277/577 |
| 3,570,037 A * | 3/1971 | Rood | ...................... | B30B 15/00 15/220.4 |
| 3,902,726 A * | 9/1975 | Hisada | ................. | B63H 23/321 277/563 |
| 4,344,631 A * | 8/1982 | Winn | ................... | B63H 23/321 277/552 |
| 4,415,166 A * | 11/1983 | Beia | ........................ | B62D 1/16 277/551 |
| 4,886,281 A * | 12/1989 | Ehrmann | ............. | F16J 15/3204 277/560 |
| 5,411,273 A * | 5/1995 | Pietsch | ................ | F16J 15/3216 277/309 |
| 6,170,833 B1 * | 1/2001 | Cox | ..................... | F16J 15/3244 277/551 |
| 6,481,720 B1 * | 11/2002 | Yoshida | ............... | B63H 23/321 277/400 |
| 6,715,768 B1 * | 4/2004 | Bock | ..................... | F16J 15/3228 277/549 |
| 7,059,608 B2 * | 6/2006 | Ramsay | ............... | F16J 15/3268 277/551 |
| 7,770,897 B2 * | 8/2010 | Berdichevsky | ........ | F16J 15/322 277/551 |
| 8,459,654 B2 * | 6/2013 | Hatch | .................. | F16J 15/3228 277/402 |
| D733,263 S * | 6/2015 | Fujii | ........................... | D23/262 |
| 2007/0054586 A1 * | 3/2007 | Baba | .................... | F16J 15/3216 446/27 |
| 2013/0015624 A1 * | 1/2013 | Fujii | .................... | F16J 15/3228 277/361 |

FOREIGN PATENT DOCUMENTS

| JP | 2008-69909 A1 | 3/2008 |
|---|---|---|
| JP | 2009-103264 A1 | 5/2009 |

* cited by examiner

*Primary Examiner* — Vishal Patel
*Assistant Examiner* — L. Susmitha Koneru
(74) *Attorney, Agent, or Firm* — Kratz, Quintos & Hanson, LLP

(57) ABSTRACT

A thickness dimension of a peripheral edge of a seal element held by an inner brim wall portion of an outer case and an inner brim wall portion of an inner case is set to be larger than a thickness dimension of a remaining portion of the seal element, and a ring concave groove is formed on the peripheral edge of the seal element.

7 Claims, 3 Drawing Sheets

SHAFT SEAL

FIELD OF THE INVENTION

This invention relates to a shaft seal used for sealing rotation shafts and reciprocating shafts.

DESCRIPTION OF THE RELATED ART

As a conventional shaft seal, a shaft seal in which a seal element and a gasket are fit between an outer case and an inner case (refer to Japanese Provisional Publication No. 2008-69909 and No. 2009-103264, for example).

However, provided with the gasket, the number of parts is increased, assembly work needs much time, and unit price of product becomes high. And, when the gasket is omitted, the seal element may co-rotate (in case of rotation movement) and drop out (in case of reciprocating movement).

Therefore, it is an object of the present invention to provide a shaft seal which can be made with low cost, and with which the seal element is prevented from co-rotating and dropping.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
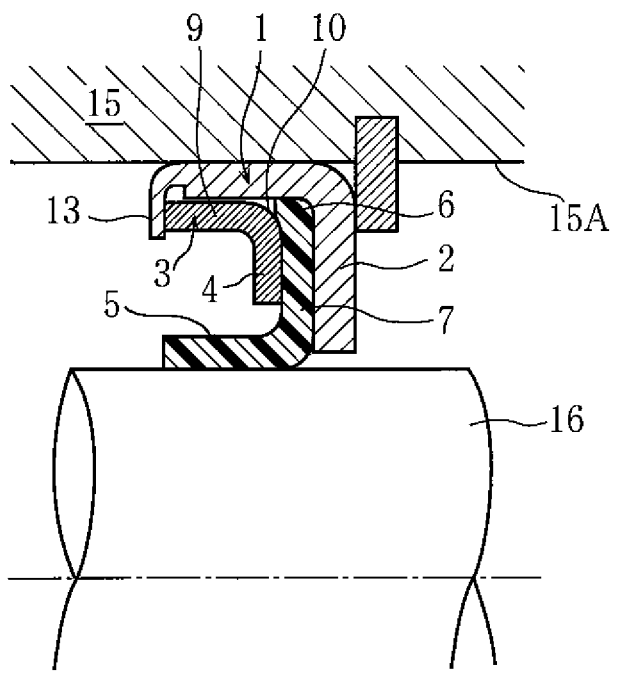
FIG. 1 is a cross-sectional view showing a first embodiment of the present invention.
Figure 2:
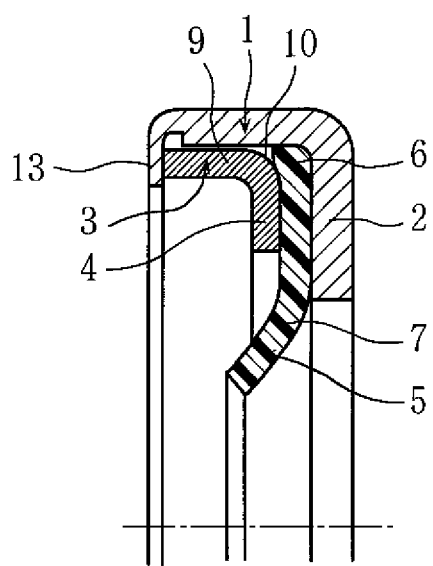
FIG. 2 is an enlarged cross-sectional view of a principal portion showing a free state.
Figure 3:
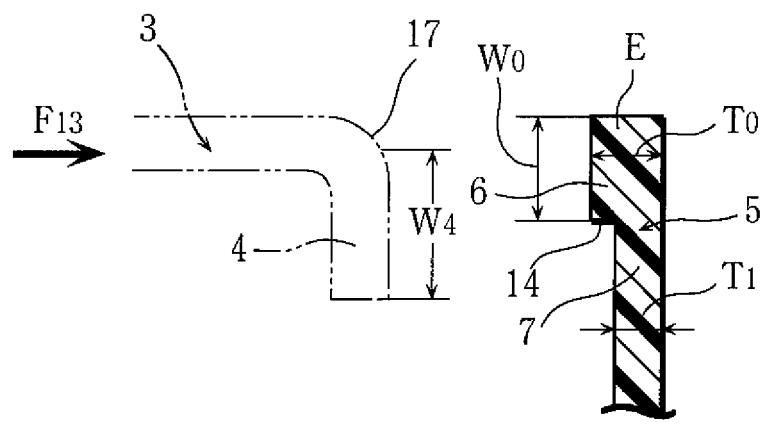
FIG. 3 is an enlarged cross-sectional view of a principal portion of a seal element.

FIG. 1 through FIG. 3 show a first embodiment of the present invention. This shaft seal, for example, is used for EGR-V, vacuum pumps, compressors, (oil-hydraulic or pneumatic) reciprocating cylinders (not shown in figures). And, the shaft seal can be used for both of rotation movement and reciprocating movement.

This shaft seal is attached to a cylindrical space portion between a circular hole portion 15A of a housing 15 and shaft 16, and provided with a seal element 5 of resin neighboring the shaft 16 (as shown in FIG. 1). A thickness dimension $T_0$ of a peripheral edge 6 of the seal element 5 of resin such as PTFE held by an inner brim wall portion 2 of an outer case 1 of metal and an inner brim wall portion 4 of an inner case 3 of metal is set to be larger than a thickness dimension $T_1$ of a remaining portion 7 of the seal element 5 in an unused state shown in FIG. 3. The peripheral edge 6 of the seal element 5 is strongly held by (caulking work of) a caulking piece portion 13 on an end of the outer case 1 in an assembled state in FIG. 1 and FIG. 2, and the peripheral edge 6 is compressed to prevent the seal element 5 from co-rotating (in case of rotation movement) and stopped (in case of reciprocating movement).

To describe concretely, as shown in FIG. 3, a thick portion E having a width $W_0$ in radial direction is formed on the peripheral edge 6 with a stage 14 in the unused state, and, $W_0 < W_4$ is set when a width dimension in radial direction on a portion on which the inner brim wall portion 4 of the inner case 3 actually press-fits (holds) the seal element 5 is $W_4$. Especially, $0.3 \cdot W_4 < W_0 < 0.7 \cdot W_4$ is preferable. That is to say, when caulking force $F_{13}$ (refer to FIG. 3) by the caulking piece portion 13 of the outer case 1 is same as that of conventional seals, pressure on compressed face (pressure on held face) in the assembled state shown in FIG. 2 is remarkably increased in the present invention. Rotation stopping force by frictional force (or stopping force against drawing in radial direction) is increased by this increased pressure to prevent the co-rotation and stop the drawing.

Further, a corner portion of a cylindrical wall portion 9 and the inner brim wall portion 4 of the inner case 3 is formed R-shaped as a curved corner portion 10, an interval dimension between the corner portion and an inner corner portion of the outer case 1 increases on an outer end in radial direction in the assembled state (FIG. 1 and FIG. 2), and a most outer peripheral end portion of the thick portion E of the seal element 5 is uncompressed (in the original thickness dimension $T_0$). Therefore, when drawing force (in radial inner direction) works, the stopping force against drawing is further strongly generated by, so to speak, wedge work.

Figure 4:
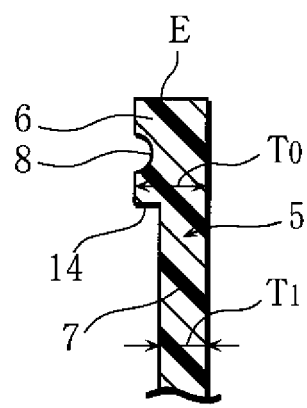
FIG. 4 is an enlarged cross-sectional view of the principal portion of the seal element in a second embodiment.

FIG. 4 shows a second embodiment. A ring concave groove 8 is formed on the peripheral edge 6 (the thick portion E) of the seal element 5. That is to say, the ring concave groove 8 is formed on a face corresponding to the inner brim wall portion 4 of the inner case 3. Other constructions are similar to that of the first embodiment.

In the embodiment shown in FIG. 1 and FIG. 2, the remaining portion 7 of the seal element 5 is shown with the same thickness dimension $T_1$. However, when desired, the thickness dimension of the remaining portion 7 may be changed large and small, for example, the thickness dimension of only a part of the remaining portion 7 which contacts (corresponds to) the shaft 16 may be set large. In a case that the thickness dimension of the remaining portion 7 is not uniform, it is preferable to make a thickness dimension of a part which contacts (corresponds to) the inner brim portion 2 of the outer case 1 (a wall portion at right angles with the axis), and $T_1'$, and $T_1' < T_0$ is set.

In other words, when the thickness dimension of the peripheral edge 6 of the seal element 5 is $T_0$, and a thickness dimension of a part among the remaining portion 7 of the seal element 5 which contacts (corresponds to) the inner brim portion 2 of the outer case 1 (a wall portion at right angles with the axis) is $T_1'$, $T_1' < T_0$ may be set (not shown in figures).

Figure 5:
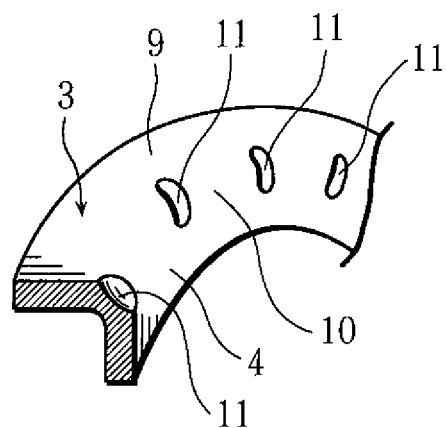
FIG. 5 is a perspective view with partial cross-section of a principal portion of an inner case in a third embodiment.

FIG. 5 shows a third embodiment. Concave portions 11 for stopping rotation are disposed on the curved corner portion 10 of the cylindrical wall portion 9 and the inner brim wall portion 4 of the inner case 3. Other constructions are similar to that of the first embodiment and the second embodiment.

Figure 6:
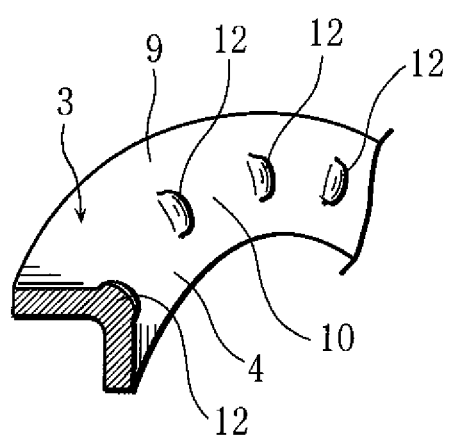
FIG. 6 is a perspective view with partial cross-section of the principal portion of the inner case in a fourth embodiment.

FIG. 6 shows a fourth embodiment. Convex portions 12 for stopping rotation are disposed on the curved corner portion 10 of the cylindrical wall portion 9 and the inner brim wall portion 4 of the inner case 3. Other constructions are similar to that of the first embodiment and the second embodiment.

The concave portions 11 and the convex portions 12 for stopping rotation are formed not by cutting, but by plastic work such as press work.

In the present invention, which is modifiable, the number of the concave portion 11 or the convex portion 12 may be singular or plural, for example.

As described above, in the present invention, the gasket can be omitted and low cost production is possible because the thickness dimension $T_0$ of the peripheral edge 6 of the seal element 5 held by the inner brim wall portion 2 of the outer case 1 and the inner brim wall portion 4 of the inner case 3 is set to be larger than the thickness dimension $T_1$ of the remaining portion 7 of the seal element 5. And, the seal element 5 can be prevented from being co-rotating and drawn off.

And, the pressure is increased to certainly prevent leakage of the sealed fluid because the ring concave groove 8 is formed on the peripheral edge 6.

And, rotation stopping can be certainly conducted because the concave portions 11 or the convex portions 12 are disposed on the curved corner portion 10 of the cylindrical wall portion 9 and the inner brim wall portion 4 of the inner case 3.

While preferred embodiments of the present invention have been described in this specification, it is to be understood that the invention is illustrative and not restrictive, because various changes are possible within the spirit and indispensable features.

What is claimed is:

1. A shaft seal comprising a construction in which:
   a thickness dimension of a peripheral edge of a seal element held by an inner brim wall portion of an outer case and an inner brim wall portion of an inner case is set to be larger than a thickness dimension of a remaining portion of the seal element to form a thick portion protruding only towards the inner case on the peripheral edge of the seal element;
   a width in radial direction of the thick portion of the seal element in unassembled state is set to be smaller than a width dimension in radial direction of a portion on which the inner brim wall portion of the inner case presses the seal element; and
   a curved corner portion is formed on a corner of a cylindrical wall portion and the inner brim wall portion of the inner case to make a most outer peripheral end portion of the thick portion of the seal element uncompressed in an assembled state, wherein
   the inner case has an upper end portion, and has an upper portion disposed between the upper end portion and the peripheral edge of the seal element,
   the upper portion extends away from the peripheral edge of the seal element,
   the outer case has a caulking piece portion covering at least a part of the upper end portion of the inner case,
   the curved corner portion of the inner case is L-shaped to increase an interval dimension between the curved corner portion and an inner corner portion of the outer case on an outer end in radial direction as to make the most outer peripheral end portion of the thick portion of the seal element uncompressed, and
   an inner face of the outer case, except the inner corner portion of the outer case, and an outer face of the inner case, except the curved corner portion of the inner case, are flat faces.

2. The shaft seal as set forth in claim 1, wherein the peripheral edge of the seal element is compressed by the caulking piece portion on an end of the outer case in an assembled state.

3. The shaft seal as set forth in claim 2 or 1, wherein a ring concave groove is formed on the peripheral edge of the seal element.

4. The shaft seal as set forth in claim 2 or 1, wherein a concave portions or a convex portion is disposed intermittently in peripheral direction on the curved corner portion of the cylindrical wall portion and the inner brim wall portion of the inner case.

5. The shaft seal as set forth in claim 2 or 1, wherein the seal element is directly press-fit to the inner brim wall portion of the outer case and the inner brim wall portion of the inner case.

6. The shaft seal as set forth in claim 5, wherein a concave portions or a convex portion is disposed intermittently in peripheral direction on the curved corner portion of the cylindrical wall portion and the inner brim wall portion of the inner case.

7. The shaft seal as set forth in claim 5, wherein the seal element is directly press-fit to the inner brim wall portion of the outer case and the inner brim wall portion of the inner case.

* * * * *